April 17, 1951     V. R. PHILLIPS     2,549,233
STRAP-SUSPENDED HOPPER CONTAINING A SECOND HOPPER, WITH
MEANS TO VARY THE FLOW OF SEED FROM A DISCHARGE COMMON
TO BOTH HOPPERS
Filed April 1, 1947     3 Sheets—Sheet 1

Inventor
Virgil R. Phillips

By Clarence A. O'Brien
and Harvey B. Jacobson
Attorneys

April 17, 1951  V. R. PHILLIPS  2,549,233
STRAP-SUSPENDED HOPPER CONTAINING A SECOND HOPPER, WITH
MEANS TO VARY THE FLOW OF SEED FROM A DISCHARGE COMMON
TO BOTH HOPPERS
Filed April 1, 1947  3 Sheets-Sheet 2

Inventor
Virgil R. Phillips

By *Clarence A. O'Brien
and Harvey B. Jacobson*
Attorneys

Inventor
Virgil R. Phillips

Patented Apr. 17, 1951

2,549,233

UNITED STATES PATENT OFFICE 2,549,233

STRAP-SUSPENDED HOPPER CONTAINING A SECOND HOPPER, WITH MEANS TO VARY THE FLOW OF SEED FROM A DISCHARGE COMMON TO BOTH HOPPERS

Virgil R. Phillips, Campbellsville, Ky.

Application April 1, 1947, Serial No. 738,545

4 Claims. (Cl. 222—145)

This invention relates generally to hand seed sowers, and more particularly to attachments which may be associated with a hand seed sower having a hopper with an apertured floor and a reciprocatively mounted apertured plate beneath said floor and operable by a hand crank, the present invention including a smaller hopper securable within the said hopper with means for fractionally dispensing the contents of this smaller hopper.

A primary object of this invention is to provide an attachment whereby, with a minimum of adjustment and alteration of the sower, the sower can be adapted for varied uses.

Another object of this invention is to provide a smaller hopper securable within the hopper ordinarily provided in devices of this character, and means associated with this smaller hopper to feed the contents thereof at different rates, that is, to feed the contents into the spout of the device in order that said contents may be sown or scattered at different rates.

And a last object to be specifically mentioned is to provide a hand seed sower attachment which is relatively inexpensive and practicable to manufacture, extremely convenient and simple to use, and which will give generally efficient and durable service.

With these and other objects in view, this invention resides in certain novel features of construction, combination and arrangement of parts and portions as will be described in detail hereinafter and particularly set forth in the appended claims, reference being had to the accompanying drawings which form a material part of this application, and in which:

Similar characters of reference designate similar or identical parts and portions throughout the specification and throughout the several views of the drawings.

Figure 1:
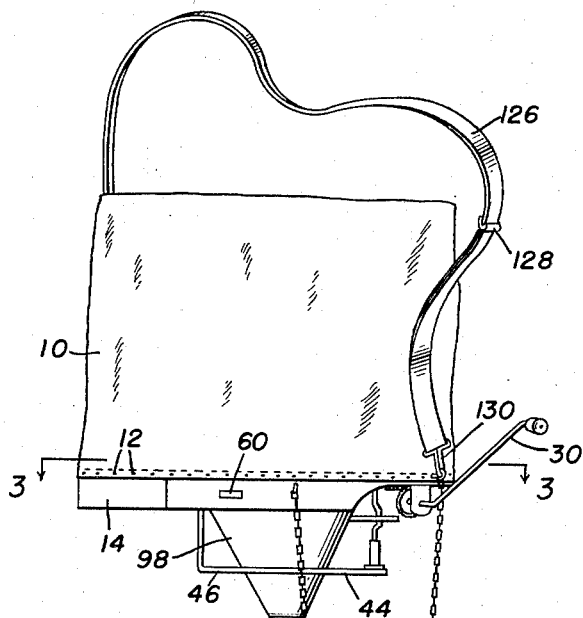
Figure 1 is a side elevational view of a sower of the type wherewith this invention is used.

Referring now to these drawings in detail, it will be noted that a sower of the character wherewith this invention is to be used includes a hopper 10 which will ordinarily be constructed of canvas material and which is secured by a plurality of tacks 12 to the frame 14 of the sower. This frame portion will ordinarily be constructed of wood and comprises two spaced upright members, shown best in Figure 2 at 16 and 18 and a floor member 20, the frame being configured with a recess, indicated at 22 in Figure 3, to adapt the frame to fit the body of the operator of the sower. The frame will be provided with two parallel cross members 24, intermediate the ends of the frame and terminally secured to the lateral upright members 16 and 18.

A bracket 26 is secured to the floor portion 20 and this bracket is provided with depending portions which are journaled to receive the shaft 28 which is provided with a hand crank 30. This shaft 28 has rigidly mounted thereon a bevel gear 32 adapted to engage another bevel gear 34 which is mounted on a shaft 36 mounted in any suitable manner for free rotation, in the floor member 20. This shaft 36 also carries a larger gear wheel 38 which is in operative engagement with a small gear wheel 40 rigidly secured on an eccentric rod 42, the latter being mounted in the floor member 20 at its upper end, and at its lower end this eccentric rod is mounted for free rotation in the forwardly extending portion 44 of a U-shaped bracket member 46. This bracket member 46 is rigidly secured to the cross members 24 of the frame, and a helical spring 48 may be compressed between a collar 50 on the eccentric rod 42 and a seating member 52 of washer character inserted on the lower end of the eccentric rod 42 and abutting the portion 44 of the said U-shaped bracket.

A plate 54 is provided with an extended offset attachment portion 56 which is apertured for the insertion of a pin 58 whereby this plate is pivotally secured to the arm 60. This arm extends transversely across the bottom of the frame and is pivotally secured to one side of the frame by a pivot pin 62, the other end of the arm extending through a slot 64 in the lateral upright member 16 of the frame. On the side of the plate 54 remote from the attachment portion 56 is an offset bifurcated portion 66 which is adapted to engage the eccentric rod 42.

Actuation of the crank handle 30 will thus be seen to cause a rocking motion in the plate 54 and this plate is apertured as at 68 to register with the aperture in the floor 20 between the cross members 24.

Figure 2:
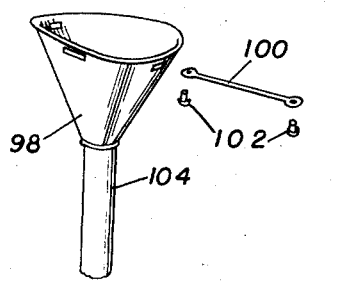
Figure 2 is a grouped view showing, in perspective, the bottom and side portions of the sower and the upper portion of what is hereinafter referred to as the spout assembly, together with the fastening means whereby this spout is secured to the bottom portion of the sower.
Figure 3:
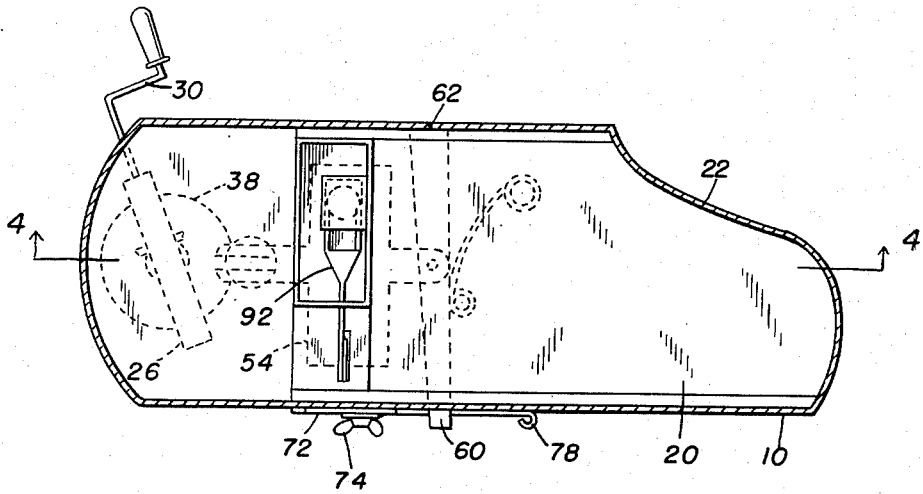
Figure 3 is a horizontal sectional view, taken on the line 3—3 in Figure 1.

The spring 70 is secured to the floor 20 and positioned so that one end of the spring bears against the arm 60 to bias this arm in one direction, as to the left in Figure 2, and an adjustable locking member 72 is secured, as best illustrated in Figure 2, to the lateral upright member 16 by a bolt and wing nut 74, this locking member being of wire form irregularly formed as illustrated in the drawings and provided with a shoulder portion 76 against which one end of the arm 60 abuts. The end of the locking member 72 is provided with a finger grip 78, whereby the locking member may be depressed to allow the arm 60 to be urged as to the left in the figures under the influence of the spring 70, thus changing the degree of registration of the aperture 68 in the plate 54 and the aperture in the floor 20, and simultaneously changing the extent of movement of the plate as a result of the action of the eccentric rod 42.

Figure 4:
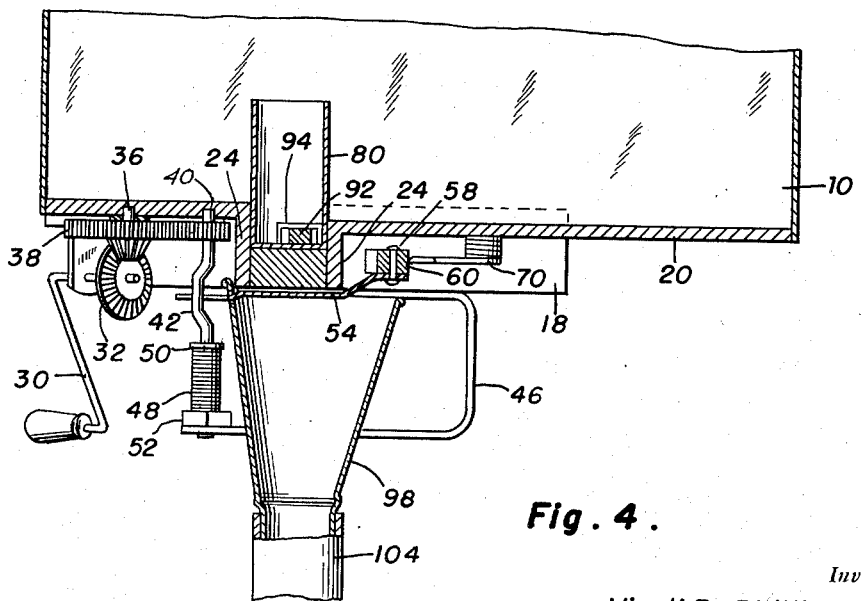
Figure 4 is a vertical sectional view, taken on the line 4—4 in Figure 3.

A smaller hopper 80 is provided with a base plate 82 adapted to fit into the trough formed between the cross members 24, as best illustrated in Figure 4. It will be noted that the base 82 has an extending portion beyond the end of the smaller hopper 80 and a simple lever 84 is pivotally mounted in this extending portion by means of a pivot pin 86, it being understood that the base 82 is suitably apertured as at 88 to receive this lever 84, and this lever extends downwardly through an aperture provided therefor in the plate 54, the lower end of this pin being illustrated in Figure 2. The upper end of the lever 84 is pivotally connected to the shank portion 90 of the bifurcated feeder 92, the furcations thereof being slidably associated within the canopy 94, the shank portion 90 having regularly spaced apertures 95 wherein the pin 93 may be selectively inserted, thus providing for variation in the throw of the feeder 92 and varying the rate of feeding. It will be clear from the foregoing that reciprocatory movement of the bifurcated feeder member 92, in coaction with the canopy 94 and the aperture 96 will cause the fractional feeding of the contents of the smaller hopper 80 through this aperture 96, and this aperture 96 registers with the apertures 68 in the opening between the cross members 24. With reference to the action of the bifurcated member 92, in connection with the canopy 94 and the outlet 96, it may be stated that the bifurcated member 92 acts both as a cutoff and as a means for forcing a quantity of seed, sometimes a unit such as a bean, into vertical registration with the aperture 96 beneath the canopy. In this connection, it may be noted that the action of the bifurcated member 92 increases and decreases along with the speed of reciprocatory movement in the member 54, so that the action of the two feeder members are properly interrelated at all times.

Figure 7:
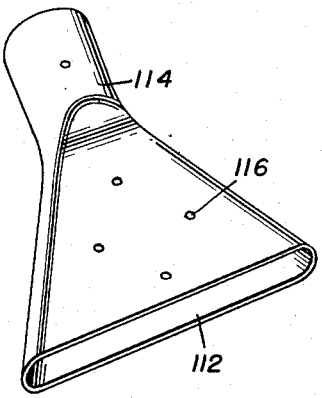
Figure 7 is a perspective view of a spreader which may be secured to the lower end of the spout assembly.
Figure 8:
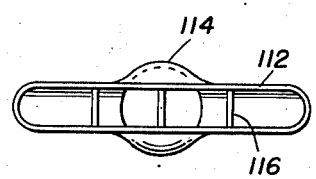
Figure 8 is a view of the spreader shown in Figure 7, the view being taken from the lower open end.
Figure 9:
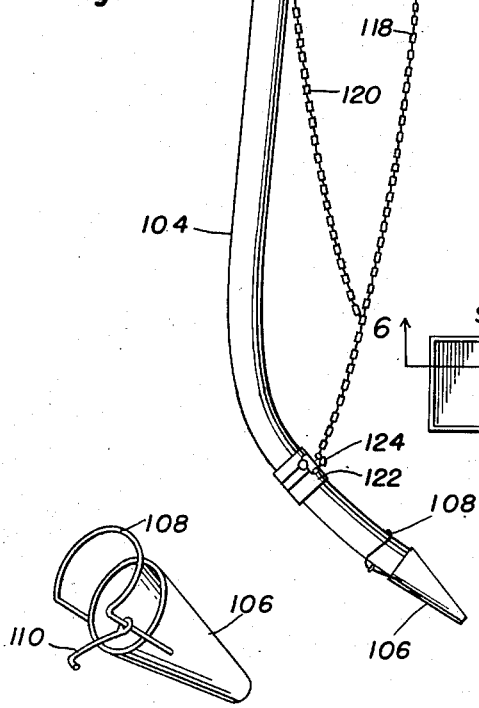
Figure 9 is a perspective view of another type of spreader with the clamping means used to secure this spreader on the lower end of the spout assembly.
Figure 5:
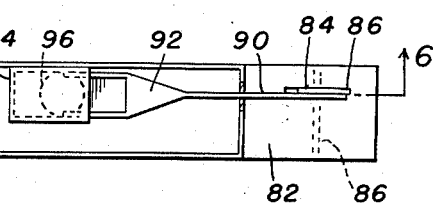
Figure 5 is a top plan view of the smaller hopper assembly which is securable within the larger hopper.
Figure 6:
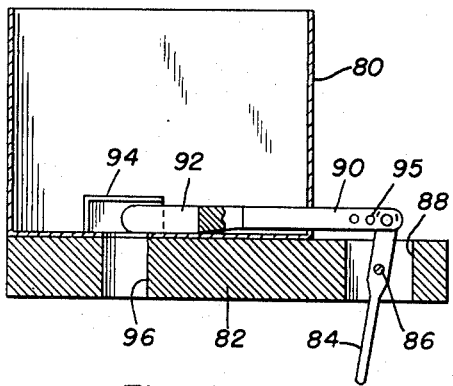
Figure 6 is a vertical longitudinal sectional view of this smaller hopper, the view being taken on line 6—6 in Figure 5.
Figure 10:
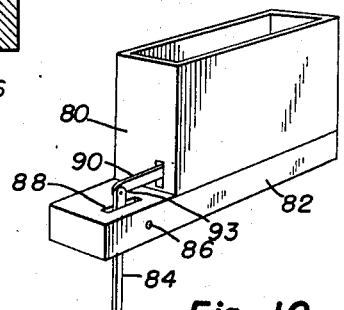
Figure 10 is a perspective view of the said smaller hopper assembly, the view including the shank portion of the bifurcated feeder and the actuating lever therefor.
Figure 11:
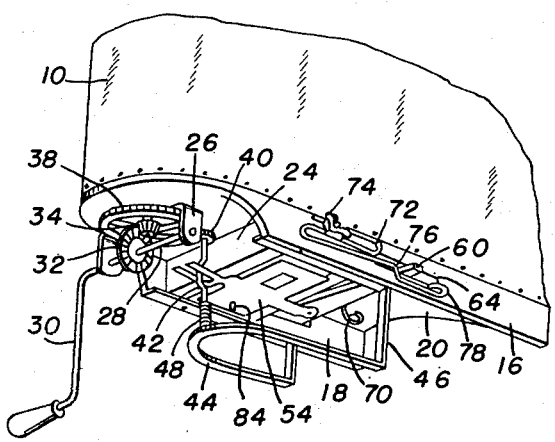
Figure 11 is a perspective view of the plate which is pivotally secured to the bottom of the frame and is operated by the hand crank assembly.
Figure 11:
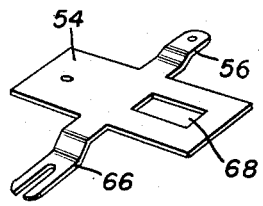

The spout assembly comprises a funnel member 98, secured by means of a cross wire 100 and screws 102, to the lateral upright members 16 and 18 of the frame, and an elongated flexible tube 104 secured to the lower end of the funnel member 98. At the lower end of the flexible tube 104 there is secured a pointed spreader 106, there being provided a wire clamp 108 to firmly hold this spreader on the end of the tube, the wire clamp comprising an arcuate portion adapted to engage the tube, offset portions secured to the spreader, and a gate or clip member 110 which may be released when it is desired to remove this spreader from the tube. An alternative type of spreader is illustrated in Figure 7, this spreader having a wide mouth 112 and a tubular portion 114 adapted to fit onto the end of the flexible tube 104, and reinforcing pins 116 are terminally secured to the flat portions forming the mouth of the spreader.

This improved sower will be provided with two guiding chains 118 and 120, terminally secured at the upper ends thereof to the frame of the sower, and secured at the other end to the tube 104 by means of a sleeve 122 and a clamp 124, these chains being provided to allow the accurate manipulation of the lower end of the tube 104 with a view to the proper spacing of the seeds or insecticide which it is desired to scatter by the use of this machine. The sower will normally be hung on the shoulder of the operator by means of a shoulder strap 126 which is made adjustable as at 128 and is secured to the convas hopper 10 at one end and to the frame of the sower at the other end, as illustrated at 130.

The operation of this invention will be clearly understood from the foregoing description of the mechanical details thereof, taken in connection with the recitation of objects sought to be achieved by this invention, but in recapitulation, it may be well to add that the sower may be used in the normal manner with the smaller hopper assembly removed, and for other particular uses the smaller hopper is inserted, more finely regulated feeding action obtainable by the use of this smaller hopper being thus made easily obtainable.

Though there has been shown a particular embodiment of this invention, this application is not limited to this particular embodiment, but it is desired to include in the scope of this invention the construction, combination and arrangement of parts and portions as substantially set forth in the appended claims.

Having thus described this invention what is claimed as new and desired to be secured by Letters Patent is:

1. A hand seed sower having a frame, a hopper with an apertured floor secured on said frame, an eccentric operable by a hand crank and a seed-directing spout assembly, comprising a plate pivotally secured to an arm on said frame and operatively associated with said eccentric, an apertured portion in said plate positioned to register with the apertured portion of said floor when the plate is in one position, whereby the sower may be operated to fractionally dispense seeds from said hopper, and a smaller hopper securable within and supported by said hopper and having a base with an outlet registering with said apertured portion of said floor, a bifurcated feeder reciprocatively mounted on said smaller hopper to urge fractionally the contents of said smaller hopper into said outlet, a lever pivoted between its ends on said hopper base and having its ends engaging said feeder and said plate.

2. A hand seed sower having a frame, a hopper with an apertured floor secured on said frame, an eccentric operable by a hand crank and a seed-directing spout assembly, comprising a plate pivotally secured to an arm on said frame and operatively associated with said eccentric, an apertured portion in said plate positioned to register with the apertured portion of said floor when the plate is in one position, whereby the sower may be operated to fractionally dispense seeds from said hopper, and a smaller hopper securable within and supported by said hopper and having a base with an outlet registering with said apertured portion of said floor, a bifurcated feeder reciprocatively mounted on said smaller hopper to urge fractionally the contents of said smaller hopper into said outlet, a lever pivoted between its ends on said hopper base and having its ends engaging said feeder and said plate, said outlet having a canopy and said bifurcated feeder having the furcations thereof slidably associated with said canopy.

3. A hand seed sower having a frame, a hopper with an apertured floor secured on said frame, an eccentric operable by a hand crank and a seed-directing spout assembly, comprising a plate pivotally secured to an arm on said frame and operatively associated with said eccentric, an apertured portion in said plate positioned to register with the apertured portion of said floor when the plate is in one position, whereby the sower may be operated to fractionally dispense seeds from said hopper, and a smaller hopper securable within and supported by said hopper and having a base with an outlet registering with said apertured portion of said floor, a bifurcated feeder reciprocatively mounted on said smaller hopper to urge fractionally the contents of said smaller hopper into said outlet, a lever pivoted between its ends on said hopper base and having its ends engaging said feeder and said plate, said bifurcated feeder being adjustably mounted on said lever by a pin selectively securable in spaced apertures in a shank portion of said bifurcated feeder.

4. A hand seed sower having a frame, a hopper with an apertured floor secured on said frame, an eccentric operable by a hand crank and a seed-directing spout assembly, comprising a plate pivotally secured to an arm on said frame and operatively associated with said eccentric, an aperture portion in said plate positioned to register with the apertured portion of said floor when the plate is in one position, whereby the sower may be operated to fractionaly dispense seeds from said hopper, and a smaller hopper securable within and supported by said hopper and having a base with an outlet registering with said apertured portion of said floor, a bifurcated feeder reciprocatively mounted on said smaller hopper to urge fractionally the contents of said smaller hopper into said outlet, a lever pivoted between its ends on said hopper base and having its ends engaging said feeder and said plate, said arm being pivotally secured to said frame and shiftable to allow partial and complete registration of said apertured portions of the plate and floor and simultaneous adjustment of the throw of said lever.

VIRGIL R. PHILLIPS.

REFERENCES CITED

The following references are of record in the file of this patent:

UNITED STATES PATENTS

| Number | Name | Date |
|---|---|---|
| 471,892 | Pickering | Mar. 29, 1892 |
| 616,316 | Haddox | Dec. 20, 1898 |
| 1,528,578 | Slavick | Mar. 3, 1925 |
| 2,337,952 | Whiten | Dec. 28, 1943 |